Aug. 20, 1957     O. G. KOLLMAN     2,803,103
DRIVE SHAFT CONNECTION ASSEMBLY FOR ROTARY POWER MOWER
Filed Sept. 14, 1955
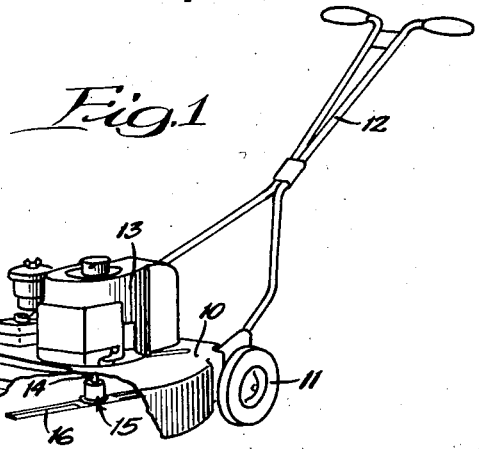
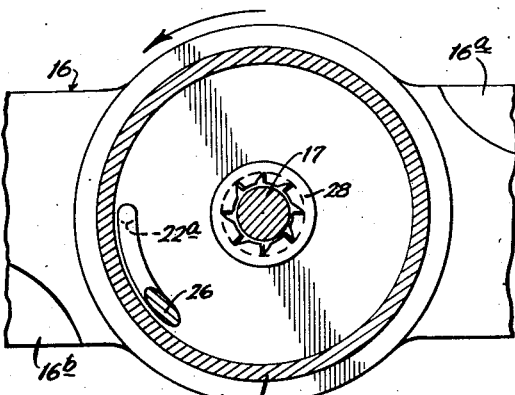
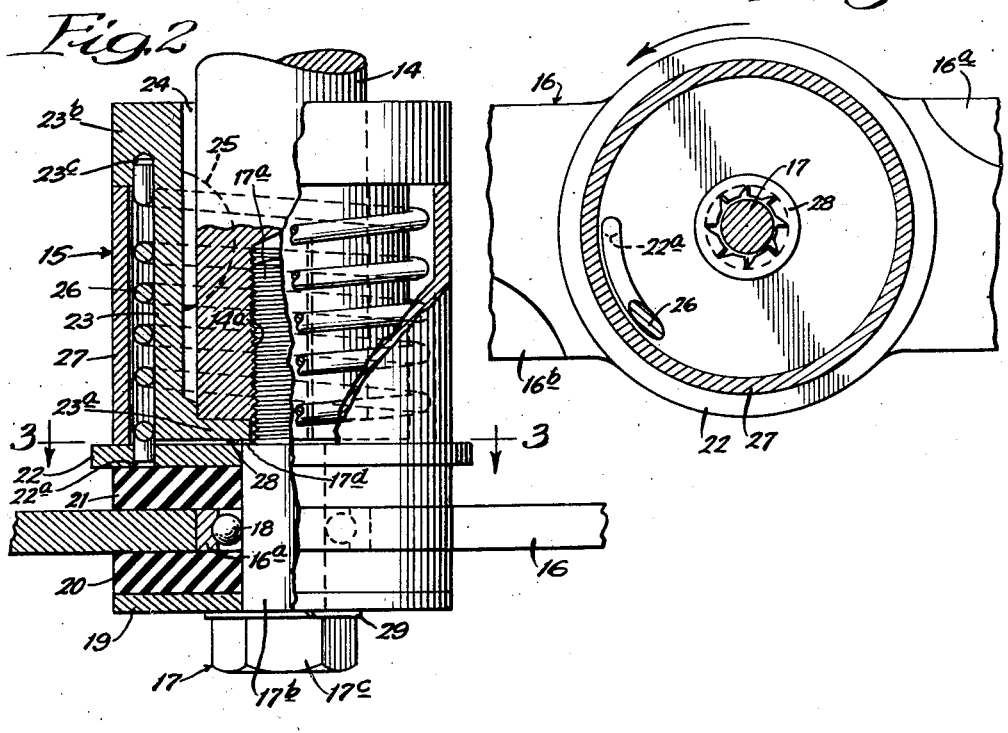
INVENTOR:
Oscar G. Kollman,
BY
Dawson Tilton & Graham,
ATTORNEYS.

United States Patent Office 2,803,103
Patented Aug. 20, 1957

2,803,103

DRIVE SHAFT CONNECTION ASSEMBLY FOR ROTARY POWER MOWER

Oscar G. Kollman, Aurora, Ill.

Application September 14, 1955, Serial No. 534,257

5 Claims. (Cl. 56—295)

This invention relates to a drive shaft connection assembly for a rotary power mower. The invention is particularly useful with rotary power motors of the type which are now widely employed for cutting grass.

From a mechanical standpoint, rotary power mowers are relatively simple devices, consisting principally of a gasoline engine for providing power to a drive shaft which in turn rotates the cutter blade. In addition, of course, a carriage or support for the engine and blade must be provided, including wheels for moving the mower over the ground. One mechanical problem has developed in connection with such mowers, however, which heretofore has not been satisfactorily solved. This problem relates to the construction of the assembly for connecting the drive shaft to the cutter blade.

In the operation of power mowers there is frequent opportunity for the rotating cutter blade to strike against relatively solid and immovable objects such as projections of the ground, rocks, sticks, etc. Some means must therefore be provided for allowing the cutter blade to decrease its rotational speed or stop entirely, while the drive shaft continues to be driven by the engine at a high rate of speed. Conventional clutch mechanisms or overload releases, however, have proven to be either too complicated and expensive or else defective in providing the required protection. This has resulted in frequent damage to the rotary mowers, causing undue wear on the moving parts and engine, and not uncommonly the fracturing of drive shafts. Apparently, even though some clutch mechanism or overload release is provided, it fails to release quickly enough to prevent damage to the drive shaft when the blade is stopped suddenly by striking against a solid object.

It is therefore a general object of this invention to provide an answer to the problem described above. More specifically, it is an object to provide an improved drive shaft connection assembly for a rotary power mower. Another object is to provide such an assembly which is adapted for installation on most of the present types of rotary mowers without requiring any extensive modification. Further objects and advantages will become apparent as the specification proceeds.

The invention is shown in an illustrative embodiment, in the accompanying drawing, in which—

Figure 1 is a perspective view of a rotary power mower embodying the present invention, the outer casing being partially broken away to show the cutter blade and the drive shaft connection assembly; Fig. 2, an enlarged fragmentary elevational view with parts broken away and shown in section of the drive shaft connection assembly of Fig. 1; and Fig. 3, a sectional plan view taken on line 3—3 of Fig. 2.

Looking first at Fig. 1, there is shown a rotary power mower of a conventional type. The mower includes a casing or carriage 10, which is mounted on wheels 11 and provided with operating handle bars 12. On top of carriage 10 there is mounted a motor 13 including the necessary auxiliary equipment, such as a carburetor, gas tank, etc. The drive shaft which is powered by motor 13 is shown extending downwardly at 14 to a drive shaft connection assembly designated generally by the number 15. Power is transmitted through the assembly 15 to cutter blade 16 during the normal operation of the mower. When the cutter blade encounters unusual resistance, assembly 15 automatically operates to effect a temporary disengagement of cutter blade 16 from drive shaft 14, thereby permitting the drive shaft to continue rotating at a high rate of speed. The details of this method of operation will now be described.

Turning now to Fig. 2, it can be seen that assembly 15 includes a number of different parts, which cooperate to produce the desired result. The drive shaft 14 is provided with a reduced extension on the lower end, which in the illustration given, consists of a bolt 17 having a threaded end portion 17a received within a threaded recess 14a of shaft 14 and an outwardly extending smooth portion 17b adjacent bullhead 17c. Threaded portion 17a is separated from smooth shank portion 17b by an annular shoulder 17d. The axis of bolt 17 is aligned with the rotational axis of shaft 14, so that cutter blade 16 can be mounted on smooth extension 17b. In the illustration given, blade 16 has a hub portion 16a of larger diameter than bolt portion 17b and adapted to receive ball bearings 18 to reduce the friction to a minimum between bolt portion 17b and cutter blade 16.

In the embodiment shown, bolt portion 17b also carries four plate elements 19, 20, 21 and 22, the plate elements being both rotatable and longitudinally shiftable with respect to bolt portion 17b. Inner plate members 20 and 21 are formed of a material having a high coefficient of friction, such as hard rubber, or other suitable friction material. It will also be noted that the combined thicknesses of the four plate elements in relation to bolt portion 17b is such that the inner plate members 20 and 21 can be spaced apart to engage the upper and lower surfaces respectively of cutter blade 16 when the blade is rotatably mounted on the drive shaft extension, as shown in Fig. 2.

A hub or sleeve 23 is mounted on the lower portion of drive shaft 14. In the illustration given, hub 23 is provided at its lower end with an inwardly extending annular flange 23a which is adapted to extend over the lower end of drive shaft 14 and to lock hub 23 against upward movement on the drive shaft. Hub 23 is connected to shaft 14 for rotation in unison therewith through a keyway 24 and a key 25. The upper end of hub 23 is provided with an outwardly projecting annular flange 23b, the purpose of which will subsequently be explained.

A compression spring 26 is loosely disposed about hub 23 so as to slidably encircle the hub. The upper end of spring 26 is connected to hub 23 by being received within recess 23c, while the lower end of spring 26 is connected to the upper or compression plate 22 by being received within bore 22a. It will be noted that the turns of spring 26 are spaced apart while the spring is under sufficient compression to urge friction plates 21 and 22 into a driving frictional engagement with cutter blade 16. Also, it is important to have the turns of spring 26 running in the opposite direction from the rotational direction of shaft 14. In other words, from the top end of the spring the wire turns extend downwardly and in a direction opposite to the direction of rotation of blade 16. When the shaft and spring are viewed from the drive end of the shaft, the turns of the spring should run counter-clockwise when the shaft is rotating clockwise or vice versa. Figure 3 shows the structure from above, the arrow indicating a counter-clockwise shaft direction while the spring runs clockwise. If viewed from below or the drive shaft end, the shaft and spring direction would be reversed but still opposite.

Preferably, there is also provided a protective sleeve or dust shield 27 disposed loosely around spring 26 between the outwardly projecting upper flange 23b of hub 23 and upper plate 22. If desired, there can also be provided a lock washer 28 between the inwardly projecting hub flange 23a and upper plate 22 for keeping shoulder bolt 17 from working loose. Also, a bushing of an appropriate size (not shown) may be included between hub 23 and shaft 14 to provide for any required size adjustment. A washer 29 is shown between bolt head 17c and the lower retaining plate 19, but this washer can be omitted if desired.

In the operation of the device, the connection assembly 15 is mounted on the end of shaft 14 in the manner described above. An assembly of this type can be readily installed on rotary mowers of most types which are now being sold commercially. No special skill, knowledge, or tools are required for the installation. Once installed, a number of important advantages are obtained. The connection assembly will prevent damage to the mower engine and the driving shaft when blade 16 is forced to slow down or brought to a stop by striking against any relatively hard objects. This is accomplished in the following way.

Since, as already described, spring 26 has its helical turns running in a direction opposite to the rotational direction of shaft 14, as soon as blade 16 is slowed or stopped, an automatic release will be effected. More specifically, the retarding of blade 16 will react through friction disc 21 to retard the rotation of upper plate 22, and thereby the lower end of spring 26. At the same time, the upper end of spring 26 will continue to rotate in unison with hub 23 through its connection thereto, and hub 23 will continue to rotate at the full speed of shaft 14. When hub 23 is constructed and arranged as described, this will have the effect of winding up the spring, that is, tending to increase the number of turns of the spring, and thereby shortening it. This shortening action will instantaneously relieve the downward pressure of plate 22, and thereby permit blade 16 to spin free with respect to friction plates 20 and 21. In other words, the slowing of blade 16 is not accomplished by acting against the downward force of spring 16, but instead, there is a positive release of this downward pressure through the mechanism just described. Perhaps this can be visualized more clearly by looking at the drawing in Fig. 3, where the rotational direction of shaft 14 is indicated by the arrow. It will be understood that only a single rotational direction exists because of the location of the sharpened portions 16a and 16b of cutter 16. The turns of spring 26 run in the opposite direction from the rotational direction of shaft 14, which as shown in Fig. 3, is clockwise, while the shaft is rotating counter-clockwise. Of course, these relative directions could be reversed while still obtaining the same result.

In operation, the connection assembly is self-adjusting and resetting. Whenever the object restricting the rotation of blade 16 is removed, spring 26 automatically extends itself while slightly unwinding and causes blade 16 to be driven at the same speed as shaft 14. In relatively heavy cutting, such as might be encountered when the mower is used for large weeds, there is also the possibility of some slippage, so that blade 16 can rotate at a somewhat slower speed than shaft 14. In other words, the device has the effect of automatically adjusting to the load requirement of the job to be done.

Other advantages of the connection assembly are that it requires no lubrication, or maintenance after it has been properly installed. Protective shield 27 keeps dirt and foreign matter from coming into contact with spring 26.

While in the foregoing specification this invention has been described with reference to a particular embodiment thereof and many details have been set forth for purpose of illustration, it will be apparent to those skilled in the art that the invention is susceptible to other embodiments and that many of the details described herein can be varied considerably without departing from the basic concepts of the invention.

I claim:

1. A cutter blade connection assembly for a rotary power mower having a substantially vertical drive shaft provided with a threaded opening extending along the rotational axis of the shaft at the lower end thereof, comprising a hub adapted to be mounted on the lower portion of said rotary power motor drive shaft for rotation in unison therewith, a bolt having a threaded end portion and a smooth portion adjacent its head, said threaded end portion being threadedly receivable in said opening with said smooth portion projecting downwardly and forming an extension of the drive shaft below said hub, four plate elements slidably and rotatably mounted on the smooth portion of said bolt, the inner two of said plate elements being formed of a material having a high coefficient of friction, a cutter blade mounted on said smooth portion of said bolt, said plate members having combined thicknesses in relation to the smooth portion of said bolt so that said inner plate members can be spaced apart to engage the upper and lower surfaces respectively of said cutter blade, and a compression spring slidably encircling said hub, the upper end of said spring being connected to said hub and the lower end of said spring being connected to the uppermost of said plates, the turns of said spring being spaced apart and running downwardly and in a direction opposite the established rotational direction of the power mower drive shaft.

2. The combination of claim 1 in which said hub has an inwardly-projecting annular flange at the bottom and an outwardly-projecting annular flange at the top, said inwardly-projecting flange extending over the outer portion of the lower end of the power mower drive shaft and locking said hub against upward movement on the drive shaft, the outwardly-projecting flange of said hub receiving the upper end of said spring and holding said spring end for rotation in unison with said hub, and a protective sleeve disposed loosely around said spring and extending between said outwardly-projecting flange and said upper plate.

3. In combination with a rotary power mower having a vertically-extending shaft for driving a cutter blade in an established rotational direction, a reduced axial extension on the lower end of said shaft, a cutter blade freely mounted on said extension, a friction plate freely mounted on said shaft extension on each side of said cutter blade for frictionally engaging said blade, a compression plate freely mounted on said shaft extension above the upper of said friction plates and bearing thereagainst, and a compression spring encircling the lower end portion of the shaft above said compression plate, the lower end of said spring being secured to said compression plate for rotation therewith, and means operatively associated with said extension for holding said spring under compression and constraining the upper end of said spring to rotate in unison with said shaft, the turns of said spring being spaced apart and running downwardly in the opposite direction from the said rotational direction of said shaft.

4. In combination with a rotary power mower, a vertically-extending power mower shaft for driving a cutter blade in an established rotational direction, a hub mounted on the lower portion of said shaft for rotation in unison with said shaft, a bolt having a head, a threaded end portion and a smooth portion therebetween, said threaded end portion being connected to the lower end of said shaft on the rotational axis thereof with said smooth portion projecting downwardly and forming an extension of said shaft, four plate elements slideably and rotatably mounted on the smooth portion of said bolt between said head and said shaft, the inner two of said plate elements being formed of a material having a high coefficient of friction, a cutter blade mounted on said smooth portion of said bolt, said plate elements having combined thicknesses in relation to the smooth portion of said bolt so that said inner plate members can be spaced apart to engage upper and lower surfaces respectively of said cutter blade, and a compression spring slideably encircling said hub above said plates, the upper end of said spring being connected to said hub and the lower end of said spring being connected to the uppermost of said plates, the turns of said spring being spaced apart and running downwardly in a direction opposite to the established rotational direction of said shaft.

5. The combination of claim 4 in which said hub has an inwardly-projecting annular flange at the bottom and an outwardly-projecting annular flange at the top, said inwardly-projecting flange extending over the outer portion of the end of said shaft and locking said hub against upward movement on said shaft, the outwardly-projecting flange of said hub receiving the upper end of said spring and holding said spring end for rotation in unison with said hub, and a protective sleeve disposed loosely around said spring and extending between said outwardly-projecting flange and said upper plate.

References Cited in the file of this patent
UNITED STATES PATENTS

| | | |
|---|---|---|
| 786,294 | Joy | Apr. 4, 1905 |
| 1,298,395 | Proctor | Mar. 25, 1919 |
| 2,151,724 | Wengel et al. | Mar. 28, 1939 |
| 2,306,730 | Holmes | Dec. 29, 1942 |
| 2,685,160 | Kuhary et al. | Aug. 3, 1954 |
| 2,707,362 | Thelander | May 3, 1955 |
| 2,726,524 | Gorin | Dec. 13, 1955 |